(12) United States Patent
Acker et al.

(10) Patent No.: US 8,360,217 B2
(45) Date of Patent: Jan. 29, 2013

(54) ACTUATOR FOR A DUAL CLUTCH

(75) Inventors: Christophe Acker, Gambsheim (FR);
Sibylle Hahn, Rheinmuenster (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/031,940

(22) Filed: Feb. 22, 2011

(65) Prior Publication Data

US 2011/0139571 A1 Jun. 16, 2011

Related U.S. Application Data

(63) Continuation of application No. PCT/DE2009/001084, filed on Aug. 3, 2009.

(30) Foreign Application Priority Data

Aug. 22, 2008 (DE) .................. 10 2008 039 358
Dec. 18, 2008 (DE) .................. 10 2008 063 749
Mar. 18, 2009 (DE) .................. 10 2009 013 446

(51) Int. Cl.
*F16D 25/10* (2006.01)
(52) U.S. Cl. ............... 192/48.603; 192/48.8; 192/30 W
(58) Field of Classification Search ............ 192/48.603, 192/85.51, 85.52, 48.608, 48.616, 48.61, 192/48.617
See application file for complete search history.

(56) References Cited

U.S. PATENT DOCUMENTS

| 3,842,954 | A | * | 10/1974 | Honemann ............... 192/96 |
| 4,044,871 | A | * | 8/1977 | Kiener .................. 192/85.5 |
| 4,585,105 | A | * | 4/1986 | Iio et al. ................... 192/96 |
| 4,705,151 | A | * | 11/1987 | Leigh-Monstevens et al. 192/30 W |
| 4,869,355 | A | * | 9/1989 | Corral et al. ................ 192/98 |
| 2007/0204709 | A1 | * | 9/2007 | Mesiti et al. ............... 74/330 |
| 2011/0139565 | A1 | * | 6/2011 | Acker ................... 192/48.1 |

FOREIGN PATENT DOCUMENTS

| DE | 15 05 577 A1 | 7/1970 |
| DE | 199 41 837 A1 | 2/2001 |
| EP | 0 185 176 B1 | 6/1986 |
| EP | 0 931 951 A1 | 7/1999 |
| EP | 1 413 795 A2 | 4/2004 |
| EP | 1 830 095 A1 | 9/2007 |
| FR | 2 851 627 A1 | 8/2004 |
| GB | 2 182 410 A | 5/1987 |
| WO | 02/057647 A1 | 7/2002 |

* cited by examiner

*Primary Examiner* — Rodney Bonck
(74) *Attorney, Agent, or Firm* — Lucas & Mercanti, LLP; Klaus P. Stoffel

(57) ABSTRACT

An actuator for a dual clutch, by which a first release bearing can be pulled and a second release bearing can be pressed and which has a compact design.

19 Claims, 5 Drawing Sheets ion device for a double clutch, whereby the
double clutch comprises a first partial clutch and a second
partial clutch, through which a drive shaft of a drive with a
first and second transmission input shaft of a double clutch
transmission are connectable, whereby the actuation device
comprises a first pneumatically or hydraulically actuatable
cylinder unit with cylinder housing and piston for pulling an
actuation bearing that comprises a partial clutch, and whereby
the actuation device comprises a second pneumatically or
hydraulically actuatable cylinder unit with cylinder housing
and piston for pushing an actuation bearing of the other partial
clutch.# ACTUATOR FOR A DUAL CLUTCH This application is a continuation of PCT/EP2009/001084
filed Aug. 3, 2009, which in turn claims the priority of DE 10
2008 039 358.4 filed Aug. 22, 2008, DE 10 2008 063" 749.1
filed Dec. 18, 2008, and DE 10 2009 013 446.8 filed Mar. 18,
2009. The priority of these applications is hereby claimed and
these applications are incorporated by reference herein.

FIELD OF THE INVENTION

The present invention relates to an actuation device for a
double clutch whereby the double clutch comprises a first
partial clutch K1 and a second partial clutch K2 through
which the one drive shaft of a drive with a first and a second
transmission input shaft of a double clutch transmission are
connectable.

Such a double clutch arrangement is well known, for
example, from EP 0 185 176 B1.

BACKGROUND OF THE INVENTION

In such a double clutch, the arrangement in which both
partial clutches K1 and K2 are open ("normally open") exists
and are closed at least by means of an actuation device. In this
arrangement, actuation forces necessary and normally alternately applied to press the clutch closed must be applied in the
same direction. These actuation forces must be supported on
a bearing on the crankshaft or in the transmission. If one
assumes that the partial clutch K1 is initially open and the
partial clutch K2 is initially closed, then the total actuation
force of the arrangement is equal to the actuation force of the
partial clutch K2. If overlapped shifting is subsequently carried out to close the partial clutch K1 and open the partial
clutch K2, then the actuation force of partial clutch K1
increases and the actuation force of partial clutch K2
decreases. The total actuation force nonetheless essentially
remains the same. In the final state, the partial clutch K1 is
closed and the partial clutch K2 opened. The total actuation
force then corresponds to the actuation force of partial clutch
1. The total actuation force in this arrangement therefore
remains essentially equally high over the entire period.

In an alternative formation of the double clutch, an arrangement exists in which the partial clutch K1 in the initial state is
closed ("normally closed") and is at least pressed open via an
actuation device, and that the partial clutch K2 in the initial
state is open ("normally open") and is pressed closed via at
least an actuation device. Two different states arise in such an
arrangement: When the partial clutch K1 is closed and the
partial clutch K2 is open, no actuation force is required. In
order to open the partial clutch K1 and close the partial clutch
K2 on the other hand, two actuation forces are required. In
this case, both actuation forces add up and yield a high axial
force on the bearing.

In truck applications that can feature torque up to 3,300 . .
. 3,500 Nm, actuation forces of up to 12,400 . . . 15,000 N
occur In truck applications, the arrangements described
above would have to support the very large actuation forces
correspondingly occurring on the crankshaft and on transmissions bearings. Target must consequently be to minimize the
necessary actuation forces and particularly the sum of both
actuation forces in order to reduce the dimension of the bearing and avoid all associated changes in the housing.

SUMMARY OF THE INVENTION

It is therefore an object of the present invention to specify
an actuation device for a double clutch of the above-mentioned type, in which the sum of necessary actuation forces
are minimized so that reinforced design of the bearing and all
corresponding, necessary changes can be dispensed with.

This object is met in accordance with this invention,
through an actuation device for a double clutch, whereby the
double clutch comprises a first partial clutch and a second
partial clutch, through which a drive shaft of a drive with a
first and second transmission input shaft of a double clutch
transmission are connectable, whereby the actuation device
comprises a first pneumatically or hydraulically actuatable
cylinder unit with cylinder housing and piston for pulling an
actuation bearing that comprises a partial clutch, and whereby
the actuation device comprises a second pneumatically or
hydraulically actuatable cylinder unit with cylinder housing
and piston for pushing an actuation bearing of the other partial
clutch.

The actuation device according to this invention is particularly suitable for application in a double clutch in that the first
partial clutch K1 is closed in its non-activated state ("normally closed") and, to open this first partial clutch K1, a
pulling force is applied ("pulled clutch") in which the second
partial clutch K2, in its non-activated state, is open ("normally open") and, to close this second partial clutch, a pushing force is applied ("pressed clutch"), so that the actuation
force of the first partial clutch K1 acts against the actuation
force of the second partial clutch K2. Accordingly, in overlapped shifting of partial clutches during gear change, the
actuation force effect on the bearing of the double clutch is
removed. With this clutch assignment of a closed "normally
open" clutch and a pulled "normally closed" clutch, the sum
of both actuation forces, pressed once and simultaneously
pulled once is approximately zero.

The first cylinder unit of the present actuation device producing a pulling force can interact, via one of the actuation
bearings, with the pulled partial clutch and the partial
clutch—closed in the normal state and the second cylinder
unit of the actuation device producing a pushing force can
interact, via the other actuation bearing, with the closed and in
the normal state open partial clutch.

In the present case, it is achieved that a sum of the actuation
forces of both partial clutches of the double clutch is minimized, through which a new definition of the bearing and
corresponding accompanying changes in the housing are
avoidable for a clutch configuration with a clutch that is
closed in the initial state and an open clutch that is closed in
the initial state. The present actuation device therefore
enables the actuation of a double clutch in which one release
bearing is pressed and a second release bearing is pulled.

In accordance with a preferred exemplary embodiment,
both cylinder units can be nested in each other and particularly also be disposed symmetrically to an axis of the transmission input shafts or to an axis of the crankshaft, so that
these, related to the axis, can form an inner cylinder unit and
an outer cylinder unit. At the same time, the outer cylinder
unit can be formed as the first cylinder unit producing a
pulling force and the inner cylinder unit can be formed as the
second cylinder unit producing a pushing force.

The actuation device can further comprise a central guide
pipe, whereby the piston of the inner cylinder unit is supported movably on the guide pipe. Further, the piston of the
inner cylinder unit can be supported on the central guide pipe
by means of preferably two support points (equally also,
another number of support points, e.g. only one support point
or three points are possible). Furthermore, the central guide
pipe can be supported non-rotatably on the transmission side,
particularly on transmission housing. Moreover, a piston of
the outer cylinder unit can be supported movably on the cylinder housing of the inner cylinder unit, preferably via exactly one, particularly convex-shaped point of support, (although also several support points are possible).

Further, the cylinder housing of the inner cylinder unit and/or the cylinder housing of the outer cylinder unit can be fastened to a rear wall of the actuation device, which is supported on the central guide pipe. Rear wall and guide pipe can be formed thereby as an integral part. Further, a preload spring for the inner cylinder unit can be disposed between rear wall and piston of the inner cylinder unit, with which the piston of the inner cylinder unit is pressed in the direction of an actuation bearing of a partial clutch K2. Moreover, a pressure chamber of the inner cylinder unit can be formed by the piston and cylinder housing of the inner cylinder chamber as well as by the rear wall. At the same time, a pressure medium of the pressure chamber of the inner cylinder unit can be connected via the rear wall. A pressure chamber of the outer cylinder unit can be formed exclusively by the piston and cylinder housing of the outer cylinder unit. At the same time, a preload spring for the outer cylinder unit can be disposed in the pressure chamber of the outer cylinder unit, so that the actuation bearing can be pulled against the lever spring of the partial clutch K1. Herewith, a pressure medium of the pressure chamber of the outer cylinder unit can be connected by means of the cylinder housing of the outer cylinder unit.

Moreover, each of the cylinder units can comprise a displacement sensor or position sensor. As a displacement or position sensor, units consisting of plunger adjoining the respective piston by means of a preload spring, hall-effect-sensors or PLCD sensors. The displacement or position sensors of both cylinder units can be disposed on the rear wall or can be integrated in the space of the actuation device.

BRIEF DESCRIPTION OF THE DRAWINGS

The present invention is clarified more closely based on the preferred exemplary embodiments in connection with the accompanying figures. This features in.

DETAILED DESCRIPTION OF THE INVENTION

The present exemplary embodiments of the actuation device are particularly applicable to vehicles with a compressed air system, thus for example in trucks.

Figure 1:
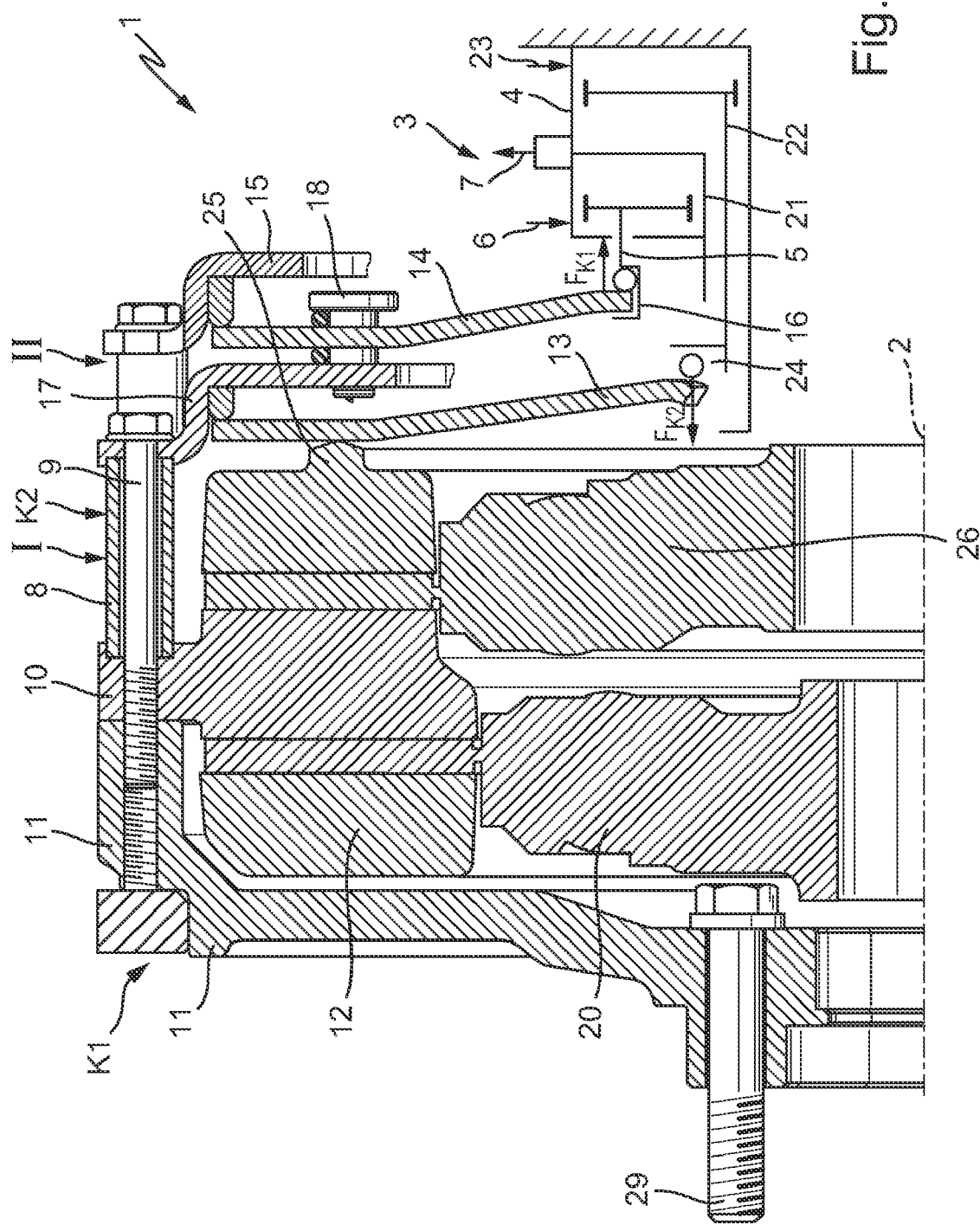
FIG. 1 shows a schematic representation of the design of an exemplary embodiment of a double clutch as a half section with a schematic representation of the present actuation device.

FIG. 1 shows schematically the design of a double clutch with pneumatically actuated central release unit for both partial clutches (hereinafter designated also as a "double CPCA"), which is used in such vehicles with compressed air systems.

The double clutch is disposed in the drive train of a vehicle between a drive and a double clutch transmission, whereby a torsion vibration-damping element like a dual mass flywheel can be disposed between the drive and double clutch.

The double clutch design 1 comprises a first partial clutch K1, which is closed ("normally closed") in the initial state, whereby the lever mechanism of this partial clutch K1 is formed such that this first partial clutch K1 is pressurized with a pulling force FK1 in order to open it, as well as a second partial clutch K2 which is open in the initial state ("normally open"), whereby the lever mechanism of this partial clutch K2 is formed such that it is pressurized with a pushing force FK2. One of the partial clutches K1 and K2 can comprise a wear readjusting device. Likewise, both partial clutches K1 and K2 respectively can comprise a wear readjusting device.

This design is particularly shown in FIG. 1, whereby the actuation forces (pulling force FK1 of partial clutch K1 and pushing force FK2 of the partial clutch K2) is produced by an actuation device 3 that is disposed centrally with respect to a rotation axis 2 of the double clutch 1 which is mainly pressurized pneumatically. Alternative hydraulic actuation is also possible without deviating from the teaching of the present invention. However, pneumatic actuation has the advantage in that it features very low sealing of air so that one can dispense with the centrifugal force balance necessary in hydraulic media, where appropriate, owing to the changing mass ratios for the actuation of clutch.

The actuation device 3 comprises a first cylinder unit ("outer cylinder unit") with cylinder housing 4 and an actuation piston 5 and at least a pressure chamber that is connectable to a pressure medium 6. The design of the first cylinder unit 4 of the actuation device 3 is such that a pulling force FK1 on the diaphragm spring 14 of the partial clutch K1 is exercised via an actuation bearing (release bearing) 16, i.e. the actuation bearing 16 conveys this pulling force FK1 to the lever spring 14, which is supported on the cover 15. An external end of the lever spring 14 (diaphragm spring 14) is supported on the cover K1. A middle section of the lever spring 14 is supported on the cover 17 of the partial clutch 17. When producing a pulling force FK1 in the first partial actuation device 4, 5, the lever spring 14 (which, for example, can be designed as a diaphragm spring) is swung around the bearing 18 and the contact surface between the lever spring 14 and release bearing 16 in FIG. 1 is displaced to the right, by what means the cover 15 (establishes the screw connection II) in FIG. 1 is moved to the left and the pressure plate 12 based on the effect of the leaf spring elements is also displaced to the left in FIG. 1, through which the clamping of the clutch disks 20, 26 is released. The clutch K1 closed in the initial state is then opened owing to the pulling force FK1.

The actuation device 3 moreover comprises a second cylinder unit ("inner cylinder unit"), which has a cylinder housing 21 and a piston 22 as well as at least a pressure chamber that is connectable to a pressure medium.

The second cylinder unit 21 is made such that a pushing force FK2 is produced, which is conveyed via the actuation bearing 24 (application bearing) on the lever spring 13. The external section of the lever spring 13 is supported on the cover 17 of the partial clutch K2, which is supported via the distance pieces 8 of the screw connections I on the central plate 10 and is fixed by means of the screws 9 of the screw connection I on the flywheel 11.

As represented, the actuation device 3 of the double clutch 1 is formed as double centrally applying element with pneumatic or hydraulic actuation. As represented, the actuation device 3 of the double clutch 1 is formed as a double centrally applying element with pneumatic or hydraulic actuation. Based on the selected force directions, the actuation forces of the clutch K1 and the actuation forces of the clutch K2 are opposite to one another on that no axial force is transferred to the crankshaft.

As further represented, the partial clutch K1 in the initial state is closed and must be pulled; in order to open it, and the partial clutch K2 in the initial state is open and must be pressed in order to close it, again, so that the actuation forces K1 and K2 oppose one another and an axial force on the crankshaft can be avoided.

The above description discloses, among other things, that both actuation forces of a double clutch—the actuation force of the closed "normally open" clutch and once the actuation force of the pulled "normally closed" clutch so that the sum of both actuation forces is almost zero, and is not required for dimensioning the crankshaft bearing or the transmission bearing.

Particularly, the preceding description discloses that the partial clutch K1 is closed in the initial state ("Normally Closed") and to open it a pulling force is applied ("pulled"), and that simultaneously the partial clutch K2 in the initial state is open ("Normally open") and to close it, a pushing force is applied ("close").

Figure 2:
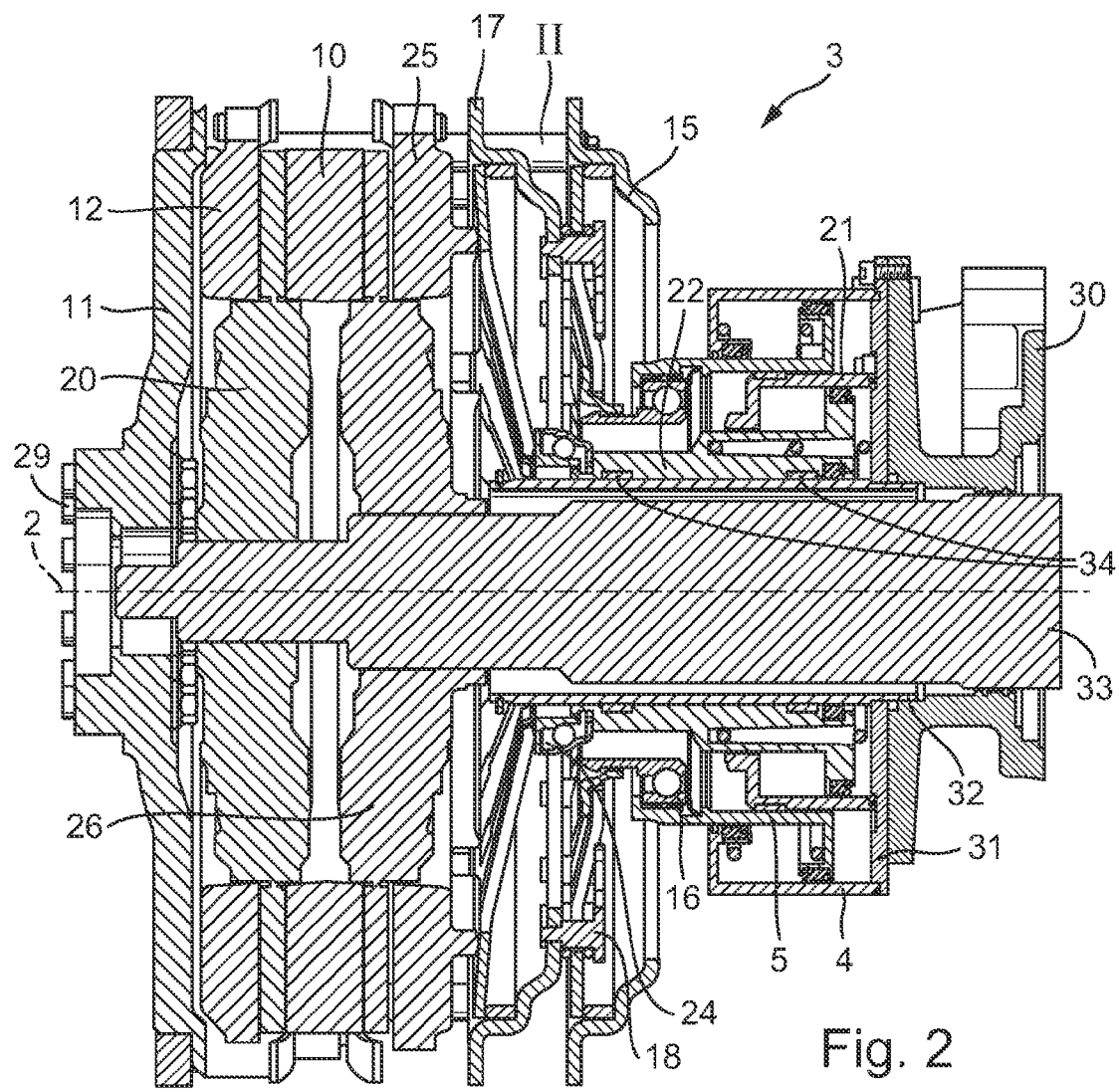
FIG. 2 shows a further schematic representation of the design of the double clutch with actuation device, whereby the actuation device is represented in more detail.

In FIG. 2, the schematically sketched design of the actuation device 3 is precisely specified for a first exemplary embodiment.

FIG. 2 shows the central guide pipe 32, which is fixed indirectly or directly via a flange 30 to transmission housing. Via the guide pipe 32 and flange 30, the present actuation device 3 is thus supported on the transmission side. Flange and guide pipe are stuck in each other at present. For connection, a (press-) fit can be provided depending on the respective application, or a form-closed connection or a material-closed connection. As an alternative to a central guide pipe, a pipe lying radially outside or between the cylinder units can be used. The term "pipe" is understood to include either circular (annular) as well as other rotationally symmetric or non-rotationally symmetric cross-sections. Especially cross-sections that are not rotationally symmetric do not provide the possibility of torsion control of piston within the cylinder.

Flange 30 and central guide pipe 32 comprise a radially internal opening through which the transmission input shafts are disposed in coaxial and nested in one another. In FIG. 2, the transmission input shafts are outlined only through section 33 because they do not feature direct reference to the functional method of the actuation device.

A rear wall 31 of the actuation device 3 is supported on the central guide pipe 32. At the same time, the central guide pipe has a shoulder section on which the rear wall lies. A (press-) fit can provide connection depending on the respective application or can provide a form-closed connection or closure by adhesive force. Particularly if the flange and guide pipe are interconnected in a fixed manner, fixed connection between the rear wall and guide pipe can also be dispensed with.

The rear wall 31 is connected fixedly with the guide pipe 32 in accordance with the present exemplary embodiment and is connected via screw connections to the flange 30. Guide pipe and rear wall could be integrated also to form a component that could be produced for example in a deep-drawing process. Between the guide pipe/rear wall (whether separate components or an integral component) on the one hand and flange 30, also other possibilities such as screw connections, for example riveting, can be used.

At the rear wall 31, the cylinder housing 4 of the outer cylinder unit and the cylinder housing 21 of the inner cylinder unit are fixed, whereby the cylinder housings 4, 21 are disposed, nested in one another and coaxial to the axis 2, so that an inner cylinder unit with the cylinder housing 21 and an outer cylinder unit with the cylinder housing 4 are formed.

At hand, screw connections are again provided between rear wall and cylinder housings, whereby, as represented above, also other types of the connection are possible, for example pasting, riveting, welding or soldering.

The piston 22 of the inner cylinder unit is supported on the central guide pipe 32 longitudinally movably over the two-support points 34.

Figure 3:
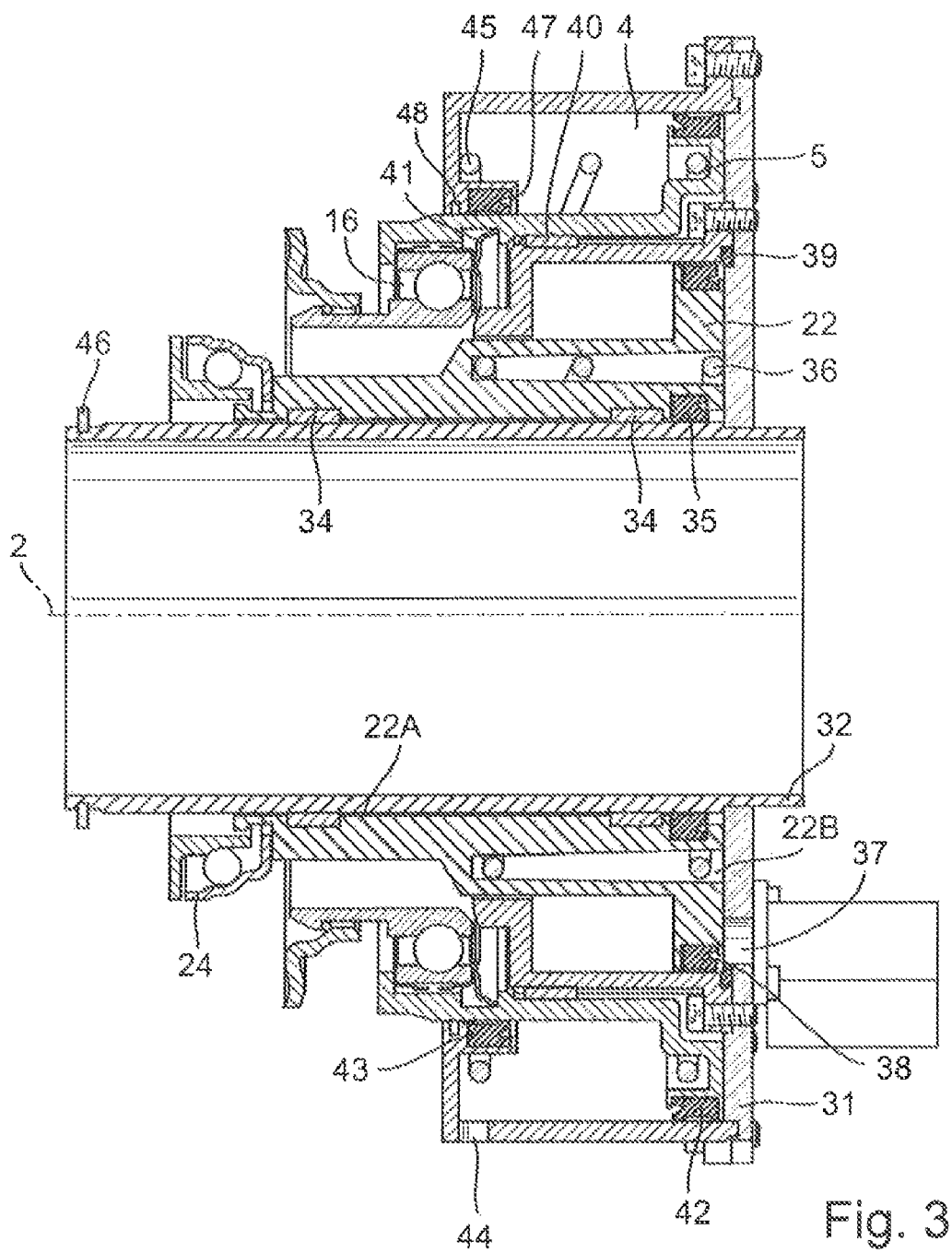
FIG. 3 shows a further schematic representation of the actuation device according to FIG. 2.

As particularly also derivable from the enlarged representation in accordance with FIG. 3, the piston 22 has a radial groove in its central opening 22A, in which a sealing ring 35 is fitted. This sealing ring 35 is meant to seal the gap between the piston 22 of the inner cylinder unit and the guide pipe 32. The piston further comprises a recess 22B extending in axial direction, in which a preload spring 36 is fitted. This preload spring is supported in the recess 22B and on the rear wall 31 so that the piston 22 is preloaded in the direction of the actuation bearing 24. The actuation bearing 24 is pressed against the diaphragm spring of the clutch K2 by means of this preload. Moreover, the ends of the preload spring are disposed such that torsion control is possible in a simple manner.

In FIG. 3, the piston 22B is represented in its rear end position. In FIG. 2, the piston is displaced by a certain distance in axial direction towards the drive unit. This axial displacement arises through the effect of a pressure medium that is fed via a connection 37 in the rear wall 31 of the pressure chamber formed between the housing 21, piston 22, and rear wall 31. This pressure chamber is sealed by the sealing ring 35 with respect to the guide pipe and the other sealing ring 38 with respect to the cylinder housing. Between the cylinder housing 21 and rear wall, a further sealing is clamped via the sealing ring 39 in order to seal also the connection point between the cylinder housing 21 and rear wall 31.

The cylinder housing of the inner cylinder unit comprises a cylindrical section aligned in axial direction. A guide 40 is disposed on the external jacket surface of this cylindrical section. The movement piston 5 of the outer cylinder unit is supported on the section, and it provides a convex-shaped guide 40. This results in a certain tilting capability of the piston of the outer cylinder unit. Convex formation is particularly therefore advantageous, in that the diameter of the cylindrical section of the cylindrical housing of the inner cylinder is relatively large with respect to the maximally possible support length on this cylindrical section (based on the ratio of diameter to support length, the usually desired support length of 1.2 to 1.5-fold of the cylindrical section's diameter cannot be provided).

The movement piston 5 of the outer cylinder unit is connected at the same time with the actuation bearing 16 in that the actuation bearings 16 is preloaded via the spring element 41 with its outside race against the movement piston.

The movement piston 5 of the outer cylinder unit forms a pressure chamber with the cylinder housing 4 of the outer cylinder unit (i.e. without the rear wall 31) for the outer cylinder unit. This pressure chamber is sealed via the sealing rings 41 and 43. The pressure medium influx takes place via the connection point 44 that directly adjoins the cylinder housing 4.

A preload spring 45 is fitted in the pressure chamber of the outer cylinder unit. Over this preload spring 45 disposed between cylinder housing 4 and movement piston 5 of the outer cylinder unit, the actuation bearing 16 is preloaded in the axial direction towards the transmission on that the actuation bearing 16 in the system is pressed with the diaphragm spring of partial clutch K1.

In the engine-side face of the cylinder housing 4 of the outer cylinder unit, a support point 48 is disposed, on which the actuation piston 5 of the outer cylinder unit is supported additionally to the support point 40.

As represented, the pistons 5 and 22 are disposed in an axially displaceable manner. A maximum movement distance of the movement piston 22 of the inner cylinder unit is limited by the stop 46. A maximum movement distance of the movement piston 5 of the outer cylinder unit is limited by the stop assembly 47.

FIGS. 1 to 3 therefore show a double-CPCA-coordination with following characteristics:

(I) the inner cylinder unit for the clutch K2 is formed as a closed clutch—open in the normal state:

The piston 22 is constrained on the guide pipe 31; the preload spring 36 produces a preload force in order to guarantee the contact between the lever spring of clutch K2 with release bearing 24 and torsion control (the ends of the preload spring are secured by stops). The air supply 37 is disposed at the lowest point of the cylinder housing.

(II) the outer cylinder unit for the clutch K1 is formed as a pulled clutch and closed in the normal state:

The piston 5 is guided on the outside diameter of cylinder housing of the inner cylinder unit of partial clutch K2; this is only at a point, whereby a convex form of this slide element 40 facilitates tilting of piston 5. The preload spring 45 produces force to guarantee torsion control and contact between lever spring and release bearing of partial clutch K1 (both ends of the preload spring 45 are secured by stops). The air supply 44 is attached at the corresponding lowest point of cylinder housing.

Figure 4:
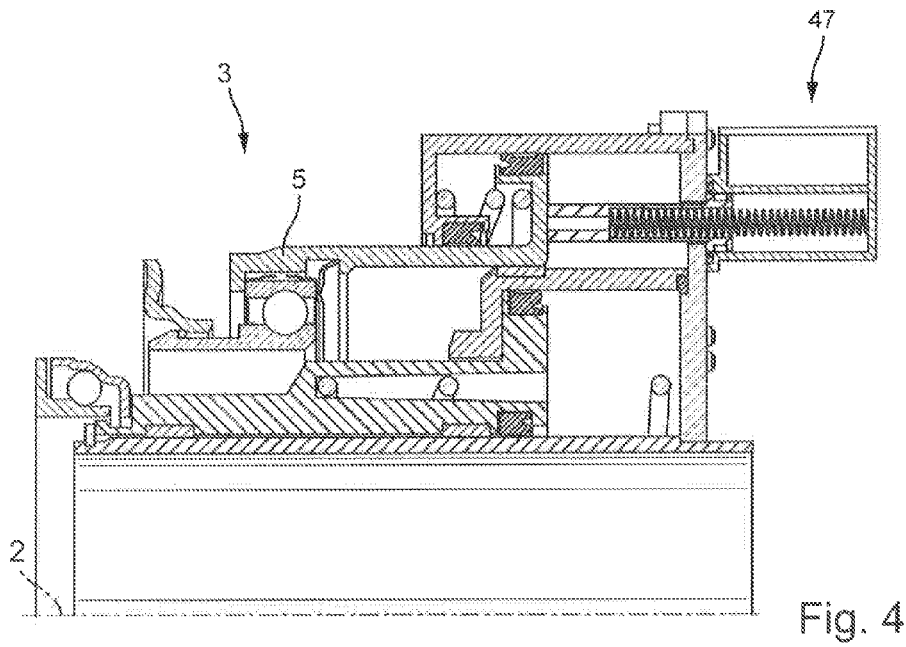
FIG. 4 shows a further schematic representation of the actuation device according to FIG. 3 and FIG. 4 as a half section with displacement sensor and/or position sensor for the outer cylinder unit.
Figure 5:
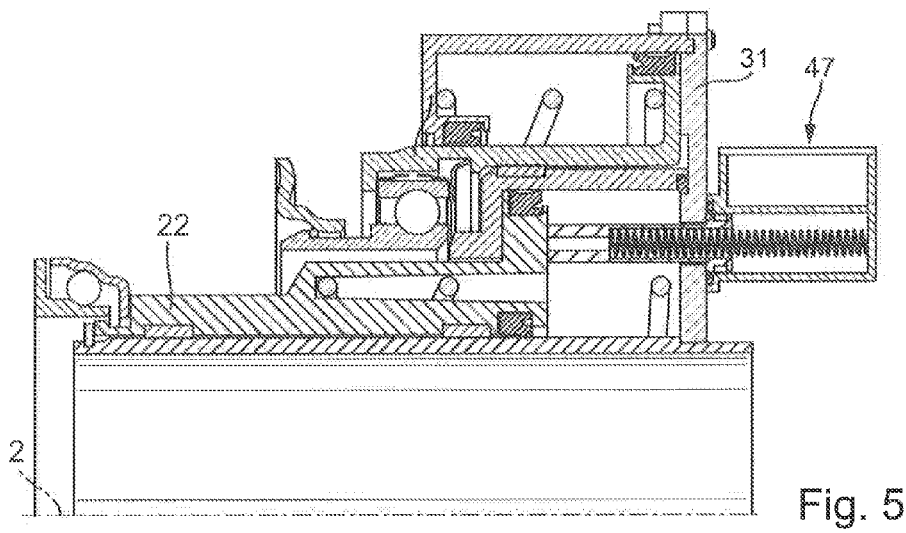
FIG. 5 shows a further schematic representation of the actuation device according to FIGS. 2 to 4 as half section with a displacement and/or position sensor for the inner cylinder unit.

In FIG. 4, the actuation device 3 is represented in accordance with FIGS. 1 to 3 in a section, in which a displacement sensor is shown for the piston 5 of outer cylinder unit. In FIG. 5, a corresponding displacement sensor unit for determining a displacement of piston 22 is represented. Both sensors are fixed on the rear wall 31, whereby the displacement distance of the actuation piston is detected via a plunger, which lies on the respective actuation piston by means of a compressive spring.

Alternatively, the displacement sensors can also be designed as a PLCD (permanent magnet linear contactless displacement sensor) or with Hall Effect.

The present arrangement of the sensor with a plunger that lies on the piston by means of a compressive spring facilitates a radial compact design of the double CPCA and simplifies signal transmission through the possibility of using plastic sensor housing like the one shown in FIGS. 4 and 5.

Figure 6:
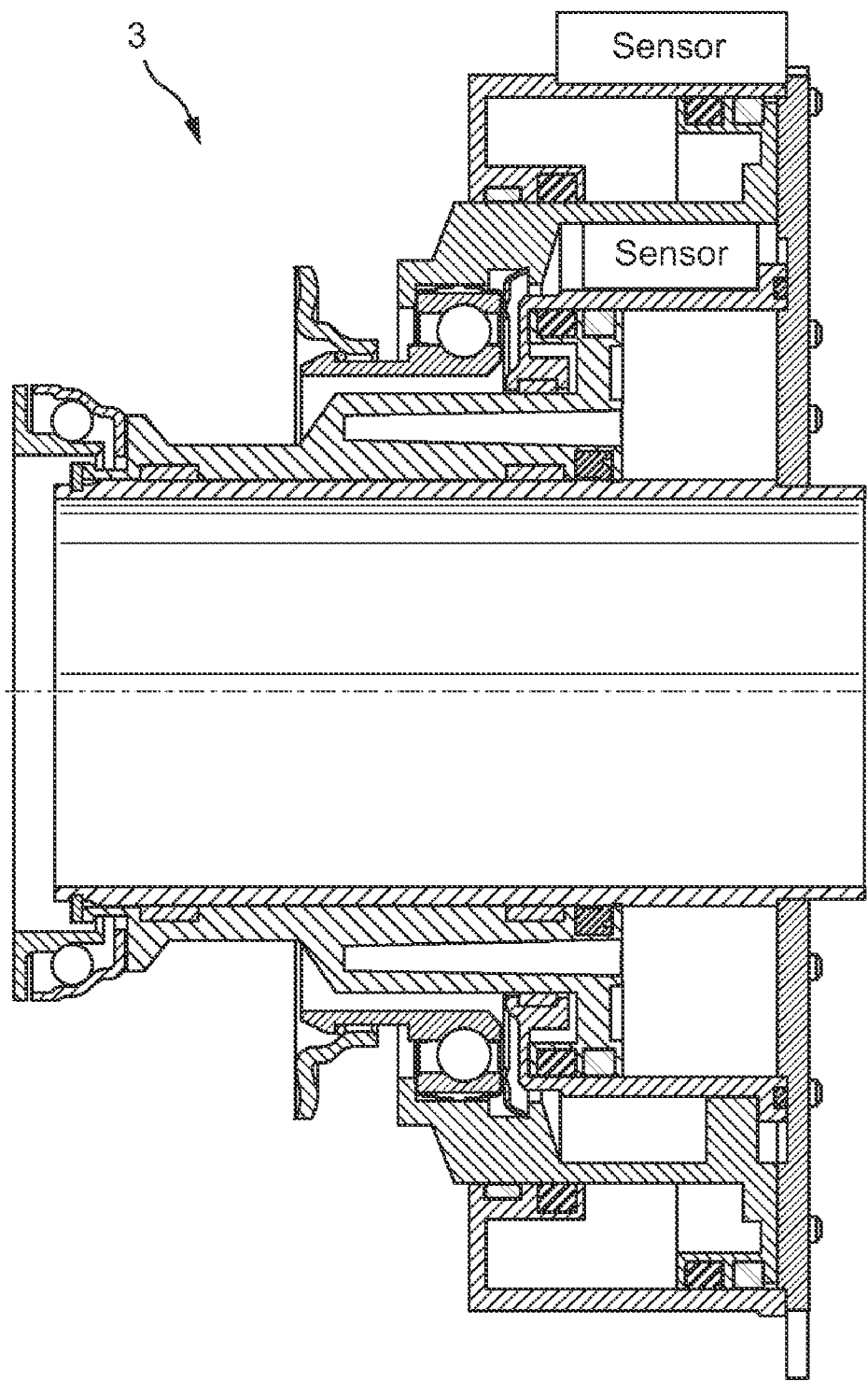
FIG. 6 shows a schematic representation of a further exemplary embodiment of the actuation device with displacement and/or position sensors integrated in the space of the actuation device for the inner cylinder unit and outer cylinder unit.

In FIG. 6, an alternative arrangement of the detection system for the actuation device 3 is shown whereby both sensors are integrated within the double CPCA space. An advantage is the fact that the sensors do not require more axial space; but the disadvantage is that the double CPCA is radially larger and as such has greater friction losses.

At present a double actuation system of the double clutch is proposed, and can pull a first release bearing, and press a second release bearing, whereby possible design is very compact and the sensors are disposed and driven directly axially by means of the actuation piston.

LIST OF REFERENCE SYMBOLS

3 Actuation device
4 Cylinder housing
5 Movement piston
16 Actuation bearing
21 Cylinder housing
22 Piston
22A Central opening
22B Extending recess
24 Actuation bearing
30 Flange
31 Rear wall
32 Guide pipe
33 Section
34 Support point
35 Sealing ring
36 Preload spring
37 Connection
38 Sealing ring
39 Sealing ring
40 Guide
41 Sealing ring
43 Sealing ring
44 Connection point
45 Support point
K1 Partial clutch
K2 Partial clutch

What we claim is:

1. An actuation device for a double clutch, which has a first partial clutch and a second partial clutch through which a drive shaft of a drive with a first transmission input shaft and a second transmission input shaft of a double clutch transmission are connectable, the actuation device comprising:
   a first pneumatically or hydraulically actuatable cylinder unit with a first cylinder housing and a first piston for pulling a first actuation bearing of one of the partial clutches; and
   a second pneumatically or hydraulically actuatable cylinder unit with a second cylinder housing and a second piston for pushing a second actuation bearing of another of the partial clutches,
   the actuation device having a transmission side facing the double clutch transmission,
   wherein the first and second cylinder units are disposed nested in one another so that the cylinder units form an inner cylinder unit and an outer cylinder unit, and
   wherein the first and second actuation bearings are disposed proximate ends of the first and second pistons that face from the transmission side.

2. The actuation device according to claim 1, wherein the first partial clutch is a pulled, normally closed partial clutch and the second partial clutch is a pushed, normally open partial clutch, the first cylinder unit producing a pulling force that interacts with the first partial clutch through the first actuation bearing, and the second cylinder unit producing a pushing force that interacts with the second partial clutch through the second actuation bearing.

3. The actuation device according to claim 1, further comprising a crankshaft, wherein both cylinder units are symmetrical to an axis of the first transmission input shaft, the second transmission input shaft and/or both the transmission input shafts and/or the crankshaft.

4. The actuation device according to claim 3, wherein the outer cylinder unit is the first cylinder unit producing a pulling force and the inner cylinder unit is the second cylinder unit producing a pushing force.

5. The actuation device according to claim 3, further comprising a central guide pipe, wherein the inner cylinder unit has a piston supported movably on the central guide pipe.

6. The actuation device according to claim 5, wherein the piston of the inner cylinder unit is supported movably on the central guide pipe at two support points.

7. The actuation device according to claim 6, wherein the central guide pipe is supported on a transmission side.

8. The actuation device according to claim 5, wherein the piston of the outer cylinder unit is supported movably on the cylinder housing of the inner cylinder unit.

9. The actuation device according to claim 8, further comprising a rear wall supported on the central guide pipe at the transmission side of the actuation device, wherein at least one of the cylinder housing of the inner cylinder unit and the cylinder housing of the outer cylinder unit is fixed on the rear wall.

10. The actuation device according to claim 9, wherein the rear wall and guide pipe are formed as integral parts.

11. The actuation device according to claim 9, further comprising a preload spring disposed between the rear wall and the piston of the inner cylinder unit so that the piston is pressed towards the actuation bearing of one of the partial clutches.

12. The actuation device according to claim 9, wherein the inner cylinder unit has a pressure chamber formed by the piston of the inner cylinder unit and the cylinder housing of the inner cylinder unit and the rear wall.

13. The actuation device according to claim 12, wherein a pressure medium to the pressure chamber of the inner cylinder unit is connected through the rear wall.

14. The actuation device according to claim 9, wherein the outer cylinder unit has a pressure chamber formed exclusively by the piston of the outer cylinder unit and the cylinder housing of the outer cylinder unit.

15. The actuation device according to claim 14, further comprising a preload spring for the outer cylinder unit disposed in the pressure chamber of the outer cylinder unit.

16. The actuation device according to claim 14, wherein a pressure medium of the pressure chamber of the outer cylinder unit is connected through the cylinder housing of the outer cylinder unit.

17. The actuation device according to claim 9, wherein each of the cylinder units has a displacement sensor or a position sensor.

18. The actuation device according to claim 17, wherein the displacement sensor or position sensor has units formed by a plunger adjoining a preload spring on one of the pistons, Hall-effect sensors or PLCD sensors.

19. The actuation device according to claim 18, wherein the displacement sensor or the position sensor of both cylinder units are disposed on the rear wall or are integrated in an actuation device space between both cylinders.

* * * * *